United States Patent
Faller et al.

(10) Patent No.: US 7,617,212 B2
(45) Date of Patent: Nov. 10, 2009

(54) SYSTEM AND METHOD FOR CONTROLLING ACCESS TO A DATABASE

(75) Inventors: David Faller, Jettingen (DE); Johannes Lebek, Stuttgart (DE); Carsten Leue, Sindelfingen (DE); Torsten Steinbach, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/169,441

(22) Filed: Jun. 29, 2005

(65) Prior Publication Data
US 2006/0031191 A1 Feb. 9, 2006

(30) Foreign Application Priority Data
Jul. 20, 2004 (EP) ................................. 04103463

(51) Int. Cl.
*G06F 7/00* (2006.01)
*G06F 17/30* (2006.01)

(52) U.S. Cl. .............................. 707/9; 707/2; 707/203; 715/741

(58) Field of Classification Search .............. 707/1–10, 707/100–104.1, 200–206
See application file for complete search history.

(56) References Cited

U.S. PATENT DOCUMENTS

| 5,280,612 A | * | 1/1994 | Lorie et al. ..................... 707/8 |
| 2002/0059324 A1 | * | 5/2002 | Kitamura et al. ............. 707/201 |

OTHER PUBLICATIONS

Keefe et al., Database concurrency control in multilevel secure database management systems, Dec. 1993, IEEE, 1039-1055.*
Atluri et al., Alternative correctness criteria for concurrent execution of transactions in multilevel secure databases, Oct. 1996, IEEE, vol. 8, 839-854.*
"A Technical Discussion of Multi Version Read Consistency", IBM, Aug. 2002, All Pages.

* cited by examiner

*Primary Examiner*—Jean B Fleurantin
(74) *Attorney, Agent, or Firm*—Kunzler & McKenzie (57) ABSTRACT

A database access controlling system controls the access to a database from a database access layer in an application, especially a relational database, with data sets that are being accessed concurrently by reading and writing transactions. The present system performs changes on the data by a writing transaction that place the changed data in a marked state. The changed data in the marked state enables concurrent transactions to recognize that the data has just been changed.

19 Claims, 5 Drawing Sheets

| Semantic State | Commit State | TID | ID |
|---|---|---|---|
| Committed | 'C' | NULL | Regular key |
| Inserted | 'I' | tid | Regular key |
| Updated | 'U' for new version<br>'C' for old version | tid | Negative key for new version<br>Regular key for old version |
| Deleted | 'D' | tid | Regular key |

| State of the row | Filtered out by select operation |
|---|---|
| Committed | No |
| Inserted by other transaction | Yes |
| Inserted by same transaction | No |
| Changed by other transaction | Original row visible |
| Changed by same transaction | Temporary row visible |
| Deleted by other transaction | No |
| Deleted by same transaction | Yes |

| Account | 123 | 456 |
|---|---|---|
| Balance | 300,00 € | 250,00 € |

| ACCOUNT | | | | |
|---|---|---|---|---|
| ACCT_NO | DEBIT | CommitState | TID | Locks |
| 123 | 300.00 | C | NULL | - |
| 456 | 250.00 | C | NULL | - |

| | | | | |
|---|---|---|---|---|
| 123 | 300.00 | C | 12345678 | X-Lock |
| 456 | 250.00 | C | NULL | - |
| -123 | 180.00 | U | 12345678 | X-Lock |

| 123 | 300.00 | C | | 12345678 | X-Lock |
|-----|--------|---|---|----------|--------|
| 456 | 250.00 | C | | 12345678 | X-Lock |
| -123 | 180.00 | U | | 12345678 | X-Lock |
| -456 | 370.00 | U | | 12345678 | X-Lock |

| ACCT_NO | DEBIT |
|---------|-------|
| 123 | 180.00 |
| 456 | 370.00 |

| ACCT_NO | DEBIT |
|---------|-------|
| 123 | 300.00 |
| 456 | 250.00 |

| 123 | 180.00 | C | | NULL | |
|-----|--------|---|---|------|--|
| 456 | 370.00 | C | | NULL | |

Fig. 11

SYSTEM AND METHOD FOR CONTROLLING ACCESS TO A DATABASE

PRIORITY CLAIM

The present application claims priority of European patent application, Ser. No. 04103463.8, titled "Method and System to Control the Access to a Database," which was filed on Jul. 20, 2004, and which is incorporated herein by reference.

FIELD OF THE INVENTION

The present invention generally relates to database access operations on a relational database, and it particularly relates to parallel and concurrent access on the same data set (row) in a table of a relational database

BACKGROUND OF THE INVENTION

Certain relational database systems allow reading and writing the same data set at the same time. This is accomplished by temporarily saving the old data value when the data set is changed and there is at least one other transaction currently active. Saving the old data value allows the relational database to provide the old value to other transactions attempting to read the just changed data set. This concept (also referred to as "multi version read consistency") enables the principle that "readers never block writers and writers never block readers".

A conventional database operates with plain lock-based read consistency; i.e., when a transaction changes a data set, the data set is locked with an X lock (exclusive). Other transactions are now blocked when attempting to access this data set. The X lock remains on the changed data set until the transaction that performed the change finishes. This leads to the principle behavior that "readers block writers and writers block readers".

This approach introduces problems with concurrent access. Transactions that just want to read data sets potentially have to wait until other transactions that changed these data sets finish. This can lead to an overall degradation of performance even though the system resources (CPU, disk etc.) are only partially occupied. This general problem is called "lock contention".

There can also be transactions that perform read and write access in a mixed manner. These transactions can lead to deadlocks such as in the following simple scenario: transaction 1 changes data set A, transaction 2 changes data set B, transaction 2 reads data set A, transaction 1 reads data set B, transaction 2 reads data set A. Both transactions are now waiting for an X lock of the other transaction. Such situations may be resolved by explicitly rolling back one of the involved transactions. "Rollback" means that all the changes of a transaction are undone.

The application has to react on deadlock error messages of the database system by, for example, starting a new transaction and reissuing all the statements.

Deadlocks worsen the overall performance significantly because it generally takes some time (seconds) for the database system to recognize a deadlock situation and resolve the deadlock situation with a rollback operation. The rolled back transaction is typically started from the beginning, further degrading database performance.

What is therefore needed is a system, a computer program product, and an associated method for controlling access to a database. The need for such a solution has heretofore remained unsatisfied.

SUMMARY OF THE INVENTION

The present invention satisfies this need, and presents a system, a computer program product, and an associated method (collectively referred to herein as "the system" or "the present system") for controlling access to a database from a database access layer in an application, especially a relational database, with data sets that are being accessed concurrently by reading and writing transactions. The present system avoids or minimizes lock contention and deadlocks.

The database access layer is external to the database. Writing transactions perform, for example, the SQL (Structured Query Language) operations INSERT, UPDATE, and DELETE.

Upon performing a writing transaction, the present system places changed data in a marked state. The marked state enables concurrent transactions to recognize that the data has just been changed. According to the present system, writing SQL transactions are not executed directly. Instead, the changes are marked in the database. The present system saves old data sets not in the database itself but rather in the level of the application that communicates with the database. The application or a database access layer cooperatively ensure that reading transactions will receive the old version of a data set and that the old version of the data set is stored temporarily for writing transactions. The present system provides the advantage that the database does not have to be adapted. The present system is database vendor independent. The application may not rely on the proprietary "multi-version read consistency" feature of an existing database system.

The present system retains a marked state of the changed data until the transaction that performed the change is finished. Upon successful completion of the writing transaction, the database access layer changes the marked state in a way that the data will further be recognizable as committed data. When a writing transaction finishes using "Commit", the changes are finally performed based on the marks.

In a concurrently reading transaction, the database access layer takes care that it receives data that is not changed and not committed. At a given point in time, there can be two versions of a single data set: the original version and the changed one. Reading SQL operations use appropriate SQL predicates to filter out the marked data sets.

A transaction always reads the original version of changed data unless the transaction performs the change. If the transaction performs the change, the transaction reads the changed version.

Data sets having been inserted but not yet committed are ignored by other transactions. Data sets having been deleted but not yet committed are still visible to other transactions. Data sets having been changed but not yet committed are visible to other transactions with their original values.

The present system controls the access from a database access layer in an application to a database, especially a relational database, with a data model containing tables of data sets that are being accessed concurrently by reading and writing transactions.

Each table is extended by an additional column comprising information indicating whether the respective data set has been committed. The additional column further comprises information indicating whether the respective data set has been inserted, updated or deleted.

Each table is extended by another additional column comprising information, which transaction has changed the respective data set. The creation of these columns happens one time, preferably at install time of the application. A second prerequisite is the existence of a unique key, e.g. though a primary key column.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
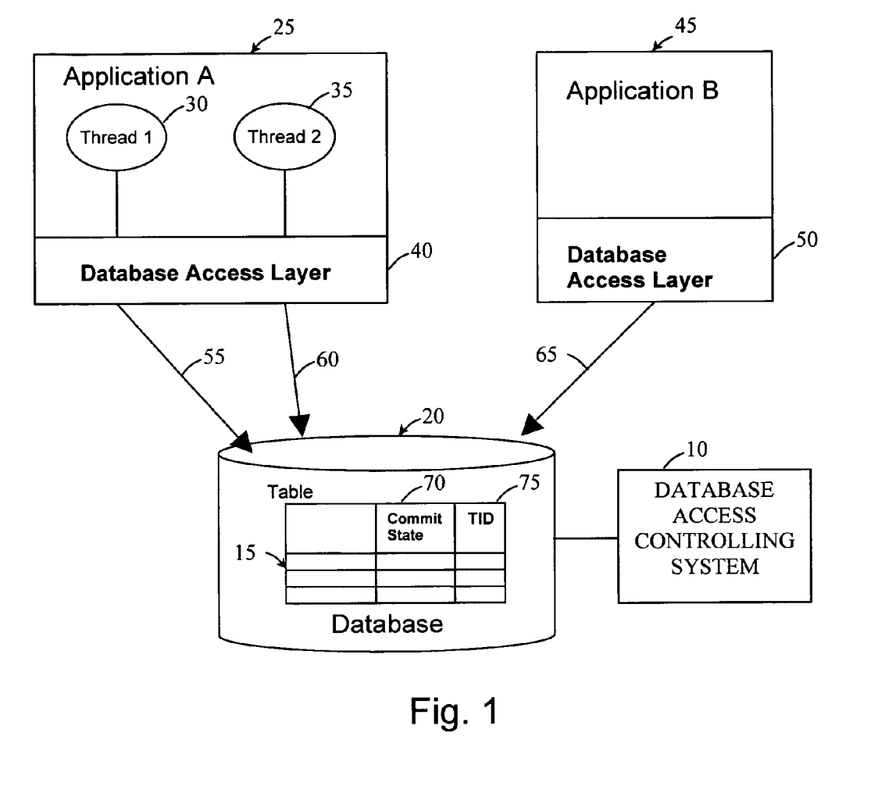
FIG. 1 is a schematic illustration of an exemplary operating system in which a database access controlling system can be used.

FIG. 1 portrays an exemplary overall environment in which a system and associated method for controlling access to a database according to the present invention may be used. System 10 comprises a software programming code or a computer program product that is typically stored on, embedded within, or installed on a computer, containing parts of a software code to execute the method described herein. Alternatively, system 10 can be saved on a suitable storage medium such as a diskette, a CD, a hard drive, a memory device, or like devices.

FIG. 1 shows a schema 15 of system 10 for controlling an access to a database 20 from database access layers of different applications. An application A, 25, comprises thread 1, 30 and thread 2, 35. Thread 1, 30, and thread 2, 35 have access to the database 20 from a data access layer A, 40. An application B, 45, has access to the database 20 from a data access layer B, 50. Thread 1, 30, accesses database 20 via connection 55. Thread 2, 35, accesses database 20 via connection 60. Application B, 45, accesses database 20 via connection 65. Connection 55, 60, 65 are parallel database connections.

System 10 is implemented in a database access layer of an application such as database access layer A, 40, and database access layer B, 50. Schema 15 comprises a table of data sets that are designated as rows. A state of the data sets is tracked in additional columns. One additional column is "commit state" column 70 ("commit state" 70). "Commit state" 70 comprises information indicating whether the data set has been committed. Another additional column is the transaction ID column 75 (TID 75). TID 70 comprises information indicating which transaction has changed a corresponding row. The creation of these columns occurs once, typically at installation of an application.

Figure 2:
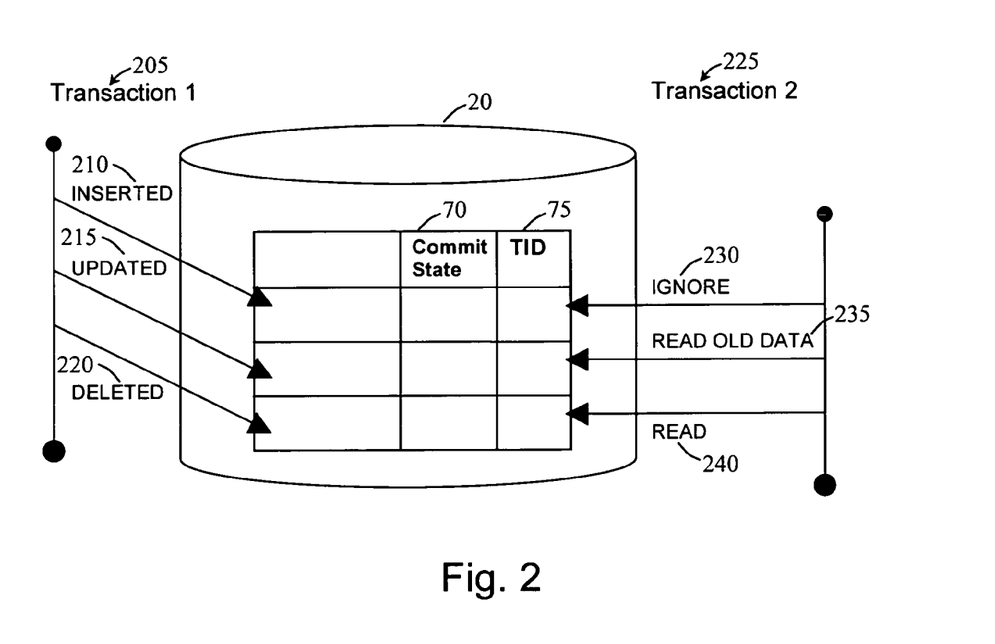
FIG. 2 is a schematic illustrating an operation of the database access controlling system of FIG. 1 in which different transactions have concurrent access to a database.

FIG. 2 illustrates different transactions with concurrent access to the database 20. For example, a transaction 1, 205, comprises SQL (Structured Query Language) operations INSERT 210, UPDATE 215, and DELETE 220 and a transaction 2, 225, comprises the operations IGNORE 230, READ OLD DATA 235, and READ 240. The operations of transaction 2, 225 are reactions corresponding to the operations concurrently performed in transaction 1, 205: just inserted data is ignored, changed data is read with old values, and deleted data is read.

Figure 3:
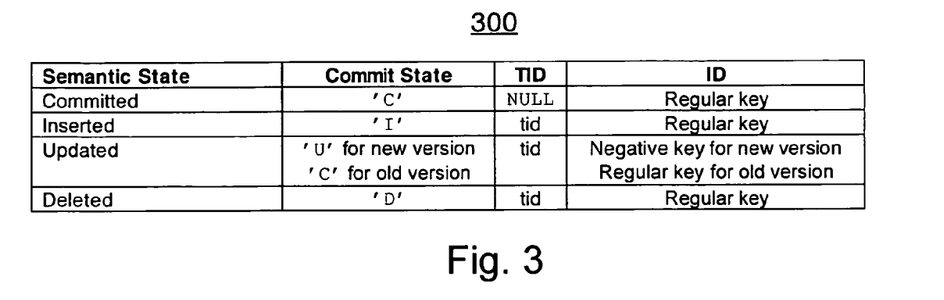
FIG. 3 is a table illustrating data sets (rows) with columns as utilized by the database access controlling system of FIG. 1.

FIG. 3 comprises Table 300, illustrating different semantic states a row in a table can comprise. Table 300 further illustrates how the different semantic states are represented by additional columns "commit state" 70 and TID 75. Table 300 comprises an ID column. ID indicates an existence a unique key, e.g., through a primary key column (ID). A cell in TID 75 with a "NULL" value indicates that the corresponding row has not been changed. The terms "tid" in TID 75 represent individual values identifying a transaction. A value "C" in "commit state" 70 indicates a committed state, a value "I: in "commit state" 70 indicates an inserted state, a value "U" in "commit state" 70 indicates an updated state, and a value "D" in "commit state" 70 indicates a deleted state.

When an application performs an insert operation, system 10 directly performs the following action:

System 10 inserts the new row is inserted and sets the commit state to 'I':

INSERT INTO . . . ( . . . , LAST_OP, TID) VALUES
( . . . , 'I', ?)

If this row (or a row with the same ID) has been previously deleted by the same transaction, the database access layer of the application receives a duplicate key exception. The database access layer receives a duplicate key exception is because the row has not been deleted directly but rather has only been marked to be deleted. When the duplicate key exception is issued by system 10, the existing row is changed by setting its commit state from D to C. Additionally, a new row with negative ID and commit state U is inserted. The result of issuing a duplicate key exception and inserting a new row is the same as if the row had been changed via UPDATE within the same transaction; DELETE+INSERT within a single transaction are logically the same as an UPDATE. In the case that the change of commit state from D to C generate a warning that no rows have been affected, the database access layer interprets that the row could not be inserted because there is already another one with the same primary key, which is marked as committed.

```
UPDATE ... SET CommitState='C' WHERE
    CommitState='D' AND TID=?

INSERT INTO ... ( ... , CommitState, TID) VAL-
    UES ( ... , 'U', ?)
```

At commit, system 10 marks all rows that have been inserted by the insert operation as committed with the following operation:

```
UPDATE ... SET CommitState='C' TID=NULL
    WHERE CommitState='I' AND TID=?
```

System 10 sets TID 75 for the corresponding row to the default value NULL. Data sets that have been deleted and again inserted within this transaction are considered semantically as being a single UPDATE operation. The treatment of those data sets is analogous to that of the data sets of the UPDATE operation.

When an application performs a delete operation, system 10 directly performs the following actions:

System 10 attempts to mark the row as deleted:

```
UPDATE ... SET CommitState='D', TID=?
    WHERE ... AND CommitState='C'
```

If this operation generates a warning that no row has been affected, the attempt to insert the row with this ID within the same transaction has been successful. System 10 then attempts to delete the row:

```
DELETE FROM ... WHERE ... AND
    CommitState='I' AND TID=?
```

If the row has been updated within the same transaction, system 10 deletes the temporarily saved:

```
DELETE FROM ... WHERE OID=-? AND Com-
    mitState ='U' AND TID=?
```

At commit, system 10 deletes all rows that have been marked by this transaction as deleted:

```
DELETE FROM ... WHERE CommitState='D'
    AND TID=?
```

When an application performs an UPDATE operation, system 10 directly performs the following actions:

System 10 X locks the row via a dummy update operation (content is not changed). A cell in TID 75 for the corresponding row is set to the current transaction. The X lock is required to prevent concurrent transactions from modifying the row during this UPDATE operation:

```
UPDATE ... SET CommitState='C', TID=?
    WHERE ... AND CommitState IN ('C', 'D')
```

If the UPDATE operation is successful, a new temporary row with commit state U is inserted that contains the new data values. The ID column is set to the negative ID of the original row. This avoids a duplicate key error and the temporary row can easily be correlated to the original row:

```
INSERT INTO ... (ID, ... , CommitState, TID)
    VALUES (-?, ... , 'U',?)
```

If the dummy UPDATE generates the warning that there have been no rows affected, the row has been inserted previously within the same transaction. In this case, the changes are performed directly and the commit state is left on I:

```
UPDATE ... SET ... WHERE ... AND
    CommitState='I' AND TID=?
```

The following actions are performed at commit:

At commit, system 10 reads the values of all temporary rows marked with commit state U and writes these values to the original row. System 10 sets TID 75 back to the default value NULL:

```
Fetch from SELECT ... FROM ... WHERE CommitState='U' AND
TID=?
Begin loop
UPDATE ... SET TID=NULL, ... WHERE OID=-? AND
CommitState='C'
End loop
```

System 10 deletes all temporary rows:

```
DELETE FROM ... WHERE CommitState='U'
    AND TID=?
```

When an application performs a SELECT operation, SQL select operations are performed using SQL isolation level "uncommitted read" (also known as "dirty read"). This prevents lock wait situations in read operations. System 10 filters out the rows that have been marked by other transactions as inserted or updated. System 10 reads rows that have been updated or deleted by other transactions with their original values:

```
SELECT ... FROM ... WHERE ... AND
    ( (CommitState IN ('C', 'D') AND TID<>? )
    OR (CommitState NOT IN ('C', 'D') AND TID=?)) WITH UR
```

Figure 4:
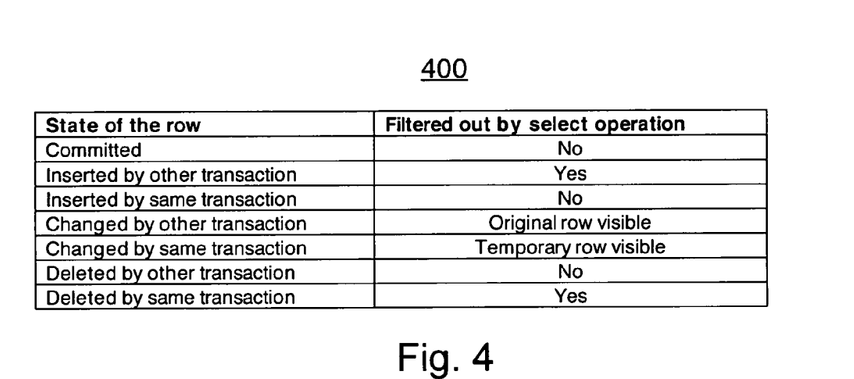
FIG. 4 is a table illustrating a "State of the row" column and a "Filtered out by select operation" utilized by the database access controlling system of FIG. 1.

FIG. 4 illustrates a table 400 that indicates whether a row of a table is filtered out, depending on the semantic state of the row. Via this SQL operation, system 10 filters out the rows "Inserted by other transaction" and "Deleted by same transaction". The rows "Committed", "Inserted by same transaction" and "Deleted by other transaction" are not filtered out. A row that was changed by another transaction is visible in its original state. A row that was changed by the same transaction is visible in its temporary state.

Operation of system 10 is demonstrated in the following exemplary transaction between accounts in a bank.

Figure 5:
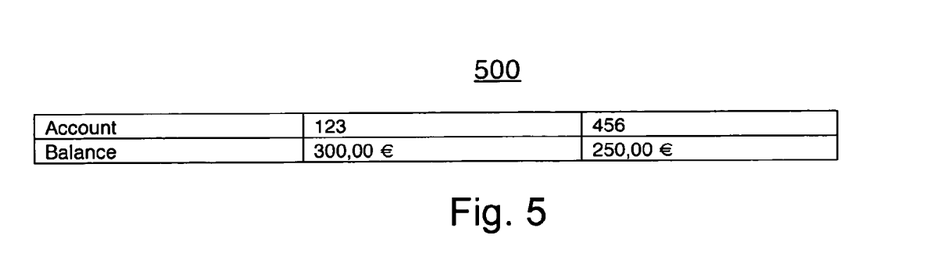
FIG. 5 is a table representing exemplary bank accounts for illustrating performance of the database access controlling system of FIG. 1.
Figure 6:
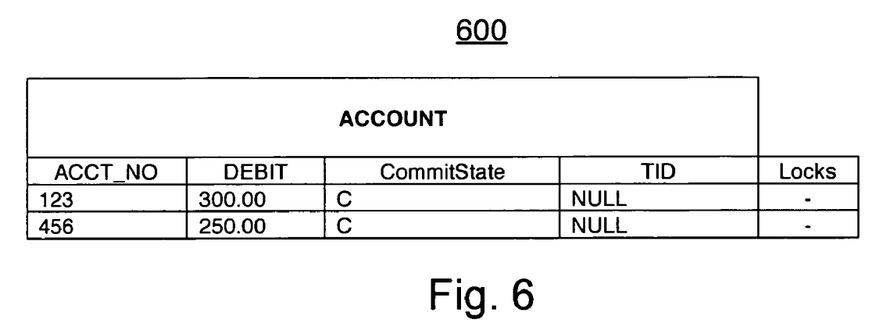
FIG. 6 is a table illustrating an exemplary schema of the database access controlling system of FIG. 1 for the exemplary bank accounts of FIG. 5.

FIG. 5 illustrates a table 500 of two accounts, account 123 and account 456, managed by a bank. FIG. 6 illustrates in table 600 an exemplary implementation of schema 15 for account 123 and account 456.

In this example, 120,00 €are transferred from account 123 to account 456. The following procedure is performed by system 10 for this purpose:

Start the transaction (if not done explicitly it happens implicitly with the first SQL operation).

Substract the amount of 120,00 €from account 123:

```
UPDATE ACCOUNT SET COMMIT_STATE = 'C', TID = 12345678
    WHERE ACCT_NO = 123 AND CommitState IN ('C', 'D')
    INSERT INTO ACCOUNT (ACCT_NO, DEBIT, CommitState, TID)
        VALUES (-123,
            (SELECT (DEBIT - 120,00) FROM ACCOUNT
                WHERE ACCT_NO = 123),
            'U', 12345678)
```

Figure 7:
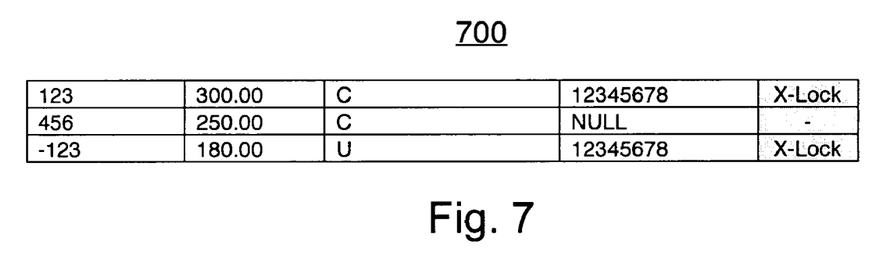
FIG. 7 is a table illustrating the schema with an X Lock placed by the database access controlling system of FIG. 1 for the exemplary bank accounts of FIG. 5.

FIG. 7 illustrates a table 700 for schema 15 that shows that ACCT_NO 123 and -123 are locked with an X Lock.

Add the amount of 120,00 €to the account 456:

```
UPDATE ACCOUNT SET COMMIT_STATE ='C', TID = 12345678
    WHERE ACCT_NO = 456 AND CommitState IN ('C', 'D')
    INSERT INTO ACCOUNT (ACCT_NO, DEBIT, CommitState, TID)
        VALUES (-456,
            (SELECT (DEBIT + 120,00) FROM ACCOUNT
                WHERE ACCT_NO = 456),
            'U', 12345678)
```

Figure 8:
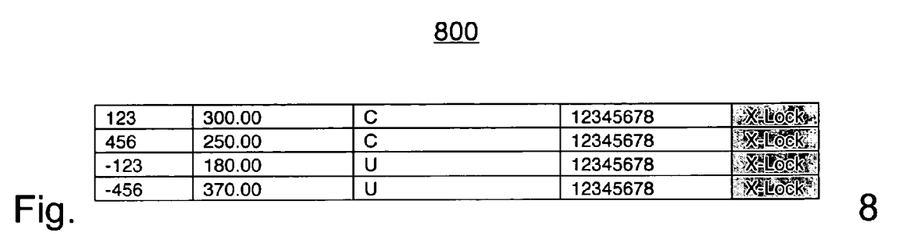
FIG. 8 is a table further illustrating the schema of the database access controlling system of FIG. 1 for the exemplary bank accounts of FIG. 5.

The same transaction reads table 800 for schema 15, illustrated in FIG. 8:

```
SELECT ACCT_NO, DEBIT FROM ACCOUNT
    WHERE ACCT_NO IN (123, 456) AND
    ( (COMMIT_STATE IN ('C', 'D') AND TID <> 12345678) OR
      (COMMIT_STATE NOT IN ('C', 'D') AND TID = 12345678)
    ) WITH UR;
```

Figure 9:
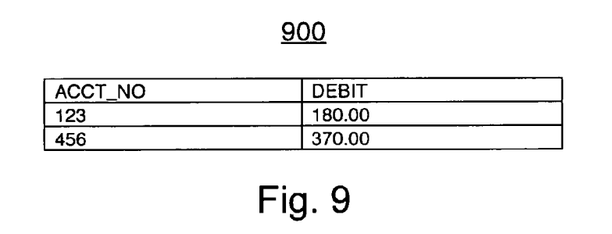
FIG. 9 is a table illustrating the schema of the database access controlling system of FIG. 1 for the exemplary bank accounts of FIG. 5 after a transfer of funds for the exemplary bank accounts.

The result set illustrated by FIG. 9 in table 900 for schema 15 reflects the transfer.

A parallel transaction concurrently reads in the accounts as well:

```
SELECT ACCT_NO, DEBIT FROM ACCOUNT
    WHERE ACCT_NO IN (123, 456) AND
    ( (COMMIT_STATE IN ('C', 'D') AND TID <> 77777777) OR
      (COMMIT_STATE NOT IN ('C', 'D') AND TID = 77777777)
    ) WITH UR;
```

Figure 10:
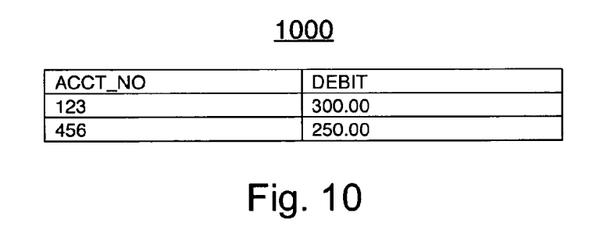
FIG. 10 is a table illustrating a result set of last committed values of the database access controlling system of FIG. 1 for the exemplary bank accounts of FIG. 5.

The result set comprises the last committed values, as represented by FIG. 10 in table 1000 of schema 15. Without the performance of system 10, the parallel transaction would have to wait for a corresponding result set until the first transaction finishes.

Terminate the transaction (requires multiple operations):

```
SELECT ACCT_NO, DEBIT FROM ACCOUNT

WHERE CommitState='U' AND TID=12345678;
```

This is performed with operations implement via fetch loop (two operations, because two results have been returned in above query):

```
UPDATE ACCOUNT SET DEBIT = 180.00, TID = NULL
    WHERE ACCT_NO = -(-123) AND CommitState = 'C';
UPDATE ACCOUNT SET DEBIT = 370.00, TID = NULL
    WHERE ACCT_NO = -(-456) AND CommitState = 'C';
```

Tidy up the temporary rows:

```
DELETE FROM ACCOUNT
    WHERE CommitState = 'U' AND
    TID = 12345678
COMMIT
```

Figure 11:
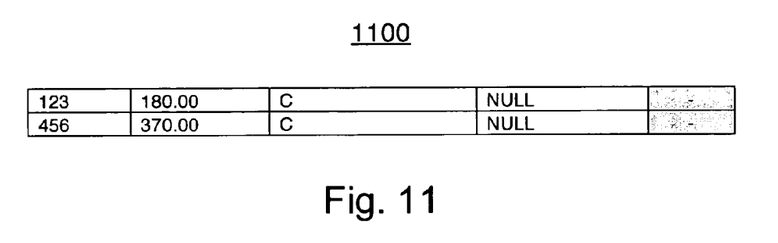
FIG. 11 is a table illustrating the schema of the database access controlling system of FIG. 1 for the exemplary bank accounts of FIG. 5 after completing the exemplary transaction for the exemplary bank accounts.

Table 1100 shown in FIG. 11 illustrates the table of schema 15 after completing the exemplary transaction.

System 10 does not introduce a problem with lost updates. For example, a second transaction (transaction ID 77777777) attempts to book an amount on one of the accounts before the another transaction (transaction 12345678) is finished; transaction 12345678 has also performed some changes:

```
UPDATE ACCOUNT SET CommitState='C',
    TID=77777777

WHERE ACCT_NO=456 AND CommitState IN ('C',
        'D');
```

This operation is blocked by the system 10 because the row for account 456 has an exclusive lock (X lock) from transaction 12345678. When the blocking transaction is finished the transaction 77777777 can continue to perform the transfer.

It is to be understood that the specific embodiments of the invention that have been described are merely illustrative of certain applications of the principle of the present invention. Numerous modifications may be made to the system and method for controlling access to a database described herein without departing from the spirit and scope of the present invention. Moreover, while the present invention is described for illustration purpose only in relation to a relational database, it should be clear that the invention is applicable as well to, for example, any database system.

What is claimed is:

1. A method of controlling access to a database from a database access layer of an application, comprising:
   accessing data in a database for performing concurrent transactions that include at least one reading transaction and at least one writing transaction, the database implemented with a processor and a memory;
   performing the writing transaction by:
      inserting a new row into the database, the new row comprising changed data in a marked state to enable the concurrent transactions to recognize that data has been changed, the marked state comprising a commit state variable, a transaction identification variable, and a negative ID; and
      temporarily storing an original version of the changed data in an original row along with a changed version in the new row; and
   wherein a database access layer provides the reading transaction with the original version of the changed data without adapting a database management application to the concurrent transactions being performed.

2. The method of claim 1, wherein the marked state of the changed data persists until the writing transaction that performed the data change is completed.

3. The method of claim 2, wherein, upon successful completion of the writing transaction, the database access layer changes the marked state so that the changed data is recognized as committed data.

4. The method of claim 3, wherein performing the reading transaction comprises the database access layer receiving only data that has not changed and that is not recognized as committed.

5. The method of claim 1, wherein performing the reading transaction comprises sequentially reading the original version of changed data and then reading the changed data.

6. The method of claim 1, wherein other transactions ignore data that is recognized as committed.

7. The method of claim 1, further comprising keeping data that has been deleted by a transaction but is not yet recognized as committed, visible to other transactions.

8. The method of claim 1, further comprising keeping data that has been changed by a transaction but is not yet recognized as committed, visible to other transactions pursuant to the original version of the changed data.

9. A computer program product having a plurality of executable code stored on a computer-readable storage medium for controlling access to a database from a database access layer of an application, comprising:
  accessing data in a database for performing concurrent transactions that include at least one reading transaction and at least one writing transaction;
  performing the writing transaction by:
    inserting a new row into the database in response to a query, the new row comprising changed data in a marked state to enable the concurrent transactions to recognize that data has been changed, the marked state comprising a commit state variable, a transaction identification variable, and a negative ID;
    temporarily storing an original version of the changed data in an original row along with the changed version in the new row;
    writing the changed data from the new row into the original row upon successful completion of the writing transaction so that the changed data is recognized as committed data; and
    deleting the new row;
  wherein a database access layer provides the reading transaction with the original version of the changed data without adapting a database management application to the concurrent transactions being performed.

10. The computer program product of claim 9, wherein the marked state of the changed data persists until the writing transaction that performed the data change is completed.

11. The computer program product of claim 10, wherein performing the reading transaction comprises the database access layer receiving only data that has not changed and that is not recognized as committed.

12. The computer program product of claim 9, wherein performing the reading transaction comprises sequentially reading the original version of changed data and then reading the changed data.

13. The computer program product of claim 9, wherein other transactions ignore data that is recognized as committed.

14. The computer program product of claim 9, further comprising keeping data that has been deleted by a transaction but is not yet recognized as committed, visible to other transactions.

15. The computer program product of claim 9, further comprising keeping data that has been changed by a transaction but is not yet recognized as committed, visible to other transactions pursuant to the original version of the changed data.

16. The computer program product of claim 9, wherein the database is a relational database.

17. A system for controlling access to a database from a database access layer of an application, comprising:
  a data model data in a database, the database implemented with a processor and a memory;
  a writer and a reader for respectively performing concurrent transactions that include at least one writing transaction and at least one reading transaction;
  the writer performing the writing transaction by:
    inserting a new row into the database, the new row comprising changed data in a marked state, to enable the concurrent transactions to recognize that data has been changed, the marked state comprising a commit state variable, a transaction identification variable, and a negative ID; and
    temporarily storing an original version of the changed data in an original row along with the changed version in the new row; and
  wherein a database access layer provides the reading transaction with the original version of the changed data without adapting a database management application to the concurrent transactions being performed.

18. The system of claim 17, wherein the database is a relational database.

19. The system of claim 17, wherein the marked state of the changed data persists until the writing transaction that performed the data change is completed.

* * * * *